United States Patent [19]
Cole et al.

[11] Patent Number: 5,099,414
[45] Date of Patent: Mar. 24, 1992

[54] INTERRUPT HANDLING IN A MULTI-PROCESSOR DATA PROCESSING SYSTEM

[75] Inventors: Terence M. Cole, Reading; Geoffrey Poskitt, College Town, both of Great Britain

[73] Assignee: International Computers Limited, London, England

[21] Appl. No.: 364,881

[22] Filed: Jun. 12, 1989

[30] Foreign Application Priority Data

Jun. 24, 1988 [GB] United Kingdom ............. 8810542

[51] Int. Cl.⁵ ............................................. G06F 13/24
[52] U.S. Cl. ................................. 395/200; 364/241.4; 364/241.5; 364/DIG. 1
[58] Field of Search ... 364/200 MS File, 900 MS File; 395/200

[56] References Cited

U.S. PATENT DOCUMENTS

| | | | |
|---|---|---|---|
| 3,286,236 | 10/1962 | Logan | 364/200 |
| 3,421,150 | 1/1969 | Quosig et al. | 340/172.5 |
| 3,665,404 | 5/1972 | Werner | 364/200 |
| 3,925,766 | 12/1975 | Bardotti | 364/200 |
| 4,009,470 | 2/1977 | Danilenko | 364/200 |
| 4,271,467 | 6/1981 | Holtley | 364/200 |
| 4,777,587 | 10/1988 | Case | 364/200 |

FOREIGN PATENT DOCUMENTS 0257348 3/1988 European Pat. Off. .

OTHER PUBLICATIONS

Q. A. Rice, "Hardware Interrupt Controller", New Electronics, Apr. 1985, p. 28.
B. Beck et al., "VLSI Assist for a Multiprocessor", ACM Operating Systems Review, Oct. 1987, pp. 10–20.
H. Kirrman, "A Serial Interprocessor Link for Multiprocessor Management in the P896 Backplane Bus", Euromicro, 1981, pp. 171–179.
H. Kirrman, "Poolpo-A Pool of Processors for Process Control Applications", IEEE Transactions on Computers, Oct. 1984, pp. 869–878.

Primary Examiner—David Y. Eng
Attorney, Agent, or Firm—Lee, Mann, Smith, McWilliams & Sweeney

[57] ABSTRACT

A multi-processor data processing system, comprises a plurality of data processing modules. A set of interrupt lines are connected in parallel to all the processing modules. Each processing module has a priority level, and the lowest priority module is selected to act as an interrupt handler, with responsibility for handling all balanced interrupts. Whenever a processing module changes it priority, it clocks to see whether the interrupt handler is still the lowest priority module and, if not, causes the role of interrupt handler to be transferred.

10 Claims, 4 Drawing Sheets

INTERRUPT HANDLING IN A MULTI-PROCESSOR DATA PROCESSING SYSTEM

BACKGROUND TO THE INVENTION

This invention relates to data processing apparatus and, more specifically, is concerned with a multi-processor data processing system.

A data processing system generally has a number of interrupt lines, for carrying interrupt signals from various sources, such as peripheral devices. In a multi-processor system the question arises of how these interrupts are to be allocated to the processors, U.S. Pat. No. 3,421,150 described a multi-processor data processing system having an interrupt directory circuit which assigns the highest priority pending interrupt request to the processor currently having the lowest interruptability index code; that is, to the most available processor.

"VLSI assist for a multi-processor", B. Beck et al, Operating Systems Review, Vol 21, No. 4, October 1987 pages 10-20, describes a multi-processor system having a system link and interrupt controller (SLIC) subsystem, which dynamically allocates interrupt requests to those processors running the least important processes.

A problem with these prior art systems is that they require special hardware for deciding which of the processors is to handle each interrupt. The object of the present invention is to avoid this problem, while still achieving balancing of the interrupt load among the processors.

SUMMARY OF THE INVENTION

According to the invention, there is provided a data processing apparatus comprising a plurality of data processing modules, each with a variable priority level, wherein a plurality of interrupt signals are distributed in parallel to all the processing modules, characterised in that, at any given time, one of the modules is designated as an interrupt handler with responsibility for handling all the interrupts, and characterised in that, whenever the priority level of any of the processing modules changes, that processing module determines whether any of the processing modules now has a priority level lower than that of the currently designated interrupt handler and, if so, causes the role of interrupt handler to be transferred to that lower priority module.

It can be seen that the invention overcomes the above-mentioned problem by pre-designating one of the processing modules as the interrupt handler, so that no special-purpose hardware is required for deciding which processing module should handle an incoming interrupt. Balancing of the interrupt load is achieved by arranging that, whenever a module changes its priority level, it checks whether any of the modules (including itself) now has a lower priority than the current interrupt handler and, if so, it designates that module as the new interrupt handler.

BRIEF DESCRIPTION OF THE DRAWINGS

One data processing system in accordance with the invention will now be described by way of example with reference to the accompanying drawings.

DESCRIPTION OF AN EMBODIMENT OF THE INVENTION

Figure 1:
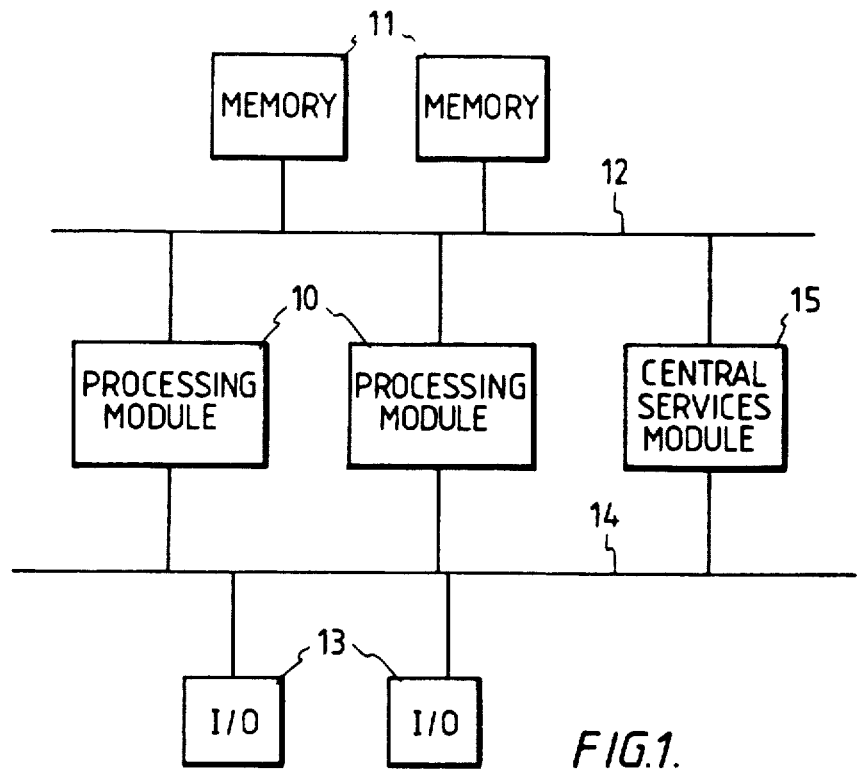
FIG. 1 is an overall block diagram of the system.

Referring to FIG. 1, the data processing system comprises a plurality of data processing modules 10. The processing modules are connected to a plurality of memory modules 11, by way of a memory bus 12. The memory modules 11 form the main memory of the system.

The processing modules 10 are also connected to a plurality of input/output (I/O) units 13, by way of an I/O bus 14. The I/O units may include, for example, disc file units, printers, and so on. The I/O bus 14 includes data and address lines, for transferring data between the processing modules and the I/O units. The I/O bus also includes a plurality of interrupt lines, for conveying interrupt signals from the I/O units to the processing modules. The interrupt lines are connected to all the processing modules in parallel, so that each module receives all the interrupts. The system also includes a central services module (CSM) 15, connected between the memory bus 12 and the I/O bus 14. The CSM 15 is also capable of generating interrupts.

Figure 2:
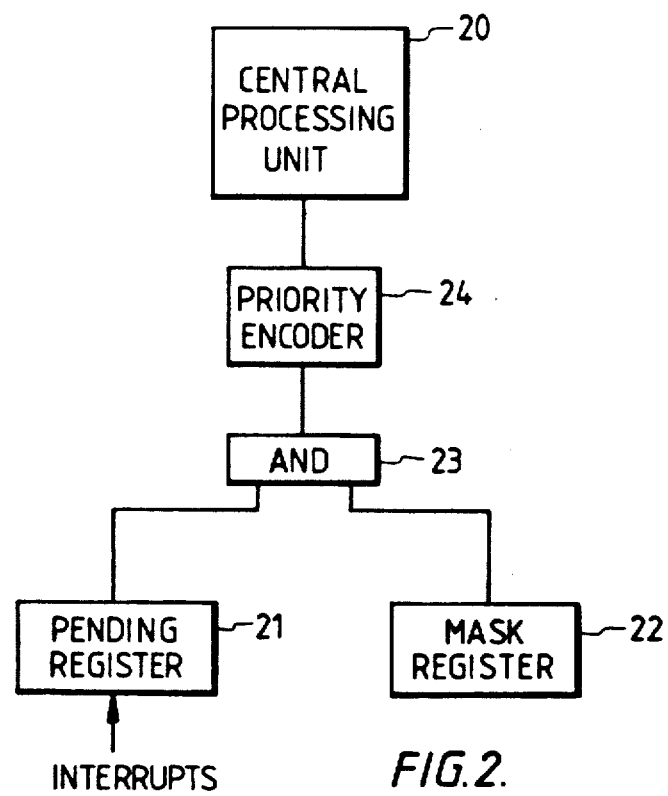
FIG. 2 shows one data processing module in more detail.

Referring now to FIG. 2, this shows one of the processing modules 10 in more detail.

The processing module includes a central processing unit (CPU) 20, which may be a known microprocessor chip.

The processing module also includes a register 21, referred to as the PENDING register, which receives interrupts both from the I/O bus and from the CSM 15. This register has one bit for each interrupt signal. When an interrupt signal is received, the corresponding bit of the PENDING register is set.

In the case of the interrupts on the I/O bus, these interrupts are applied to all the processing modules in parallel. Thus, when an interrupt is produced, it is stored in the PENDING registers of all the modules. These interrupts are cleared only when the I/O units withdraw their interrupt requests.

In the case of interrupts from the CSM, these are applied only to the processing module that is currently responsible for handling interrupts (see below). These interrupts are written directly into the PENDING register by the CSM under protection of a semaphore bit, and can be cleared by overwriting the register, as will be described.

The processing module also includes another register 22, referred to as the MASK register. This contains a set of mask bits one for each interrupt line. When a mask bit is set, the corresponding interrupt signal is unmasked, and can be received by the CPU. Conversely, when a mask bit is cleared, the corresponding interrupt signal is masked, and is ignored by the CPU.

In operation, each CPU has an internal priority level, equal to the priority of the operation it is currently performing. The lowest priority level (0) is allocated to user programs. Higher priority levels are allocated to programs for processing interrupts, according to the priority level of the interrupts. The CPU is interrupted whenever the input priority level indicated by the priority encoder 24 is greater than the internal priority level of the CPU.

The PENDING and MASK registers of each processing module can be accessed by the CPU in any module, by way of the I/O bus 14. This allows any CPU to read or write the registers in the same module, or in a different module.

The interrupts are divided into two categories: balanced and unbalanced. The responsibility for balanced interrupts can be passed from one CPU to another, by means of an interrupt balancing procedure to be described. An unbalanced interrupt, on the other hand, cannot be passed between the CPUs, but always remains with the CPU or CPUs to which it is allocated.

At any given time, one of the CPUs has responsibility for handling the balanced interrupts, this CPU being referred to as the interrupt handler. As will be described, whenever a CPU changes its priority level, it initiates a transfer of responsibility for the balanced interrupts to the CPU with the lowest priority level. This can occur in two ways. First, if the current interrupt handler increases its priority level, it may find that another CPU now has a lower priority level, and so it will hand over responsibility for interrupts to that other CPU; that is, the other CPU will become the interrupt handler. Alternatively, if a CPU other than the interrupt handler lowers its priority level, it may find that it now has a lower priority than the interrupt handler, and so will take responsibility from the interrupt handler; that is it will become the interrupt handler. If the change of priority level does not affect which is the lowest priority CPU, there will be no transfer of responsibility.

When responsibility for interrupts is transferred from one CPU to another, any active interrupts (i.e. interrupts which are already being processed by any CPU) are not transferred. Responsibility for an active interrupt remains with the CPU that is processing it, until the interrupt signal is withdrawn from the interrupt line. The CPU in question then transfers responsibility for any subsequent occurrences of that interrupt signal to the current interrupt handler.

The following control information is stored in the main memory 11, and can be accessed by any one of the CPUs.

LEVELS. This is a table having one entry for each CPU, indicating the current priority levels of the CPUs.

HANDLER. This is a pointer, indicating which of the CPUs currently has responsibility for handling balanced interrupts, i.e. which is the interrupt handler.

ACTIVE. This is a pattern of bits, one bit for each interrupt line, and indicates which of the interrupts is currently active.

SEMAPHORE. This is a semaphore bit which is used to ensure that only one CPU at a time can access the control information.

BALANCED. This is a pre-set pattern of bits indicating which of the interrupt lines are to be treated as balanced interrupts.

Interrupt handling

Figure 3:
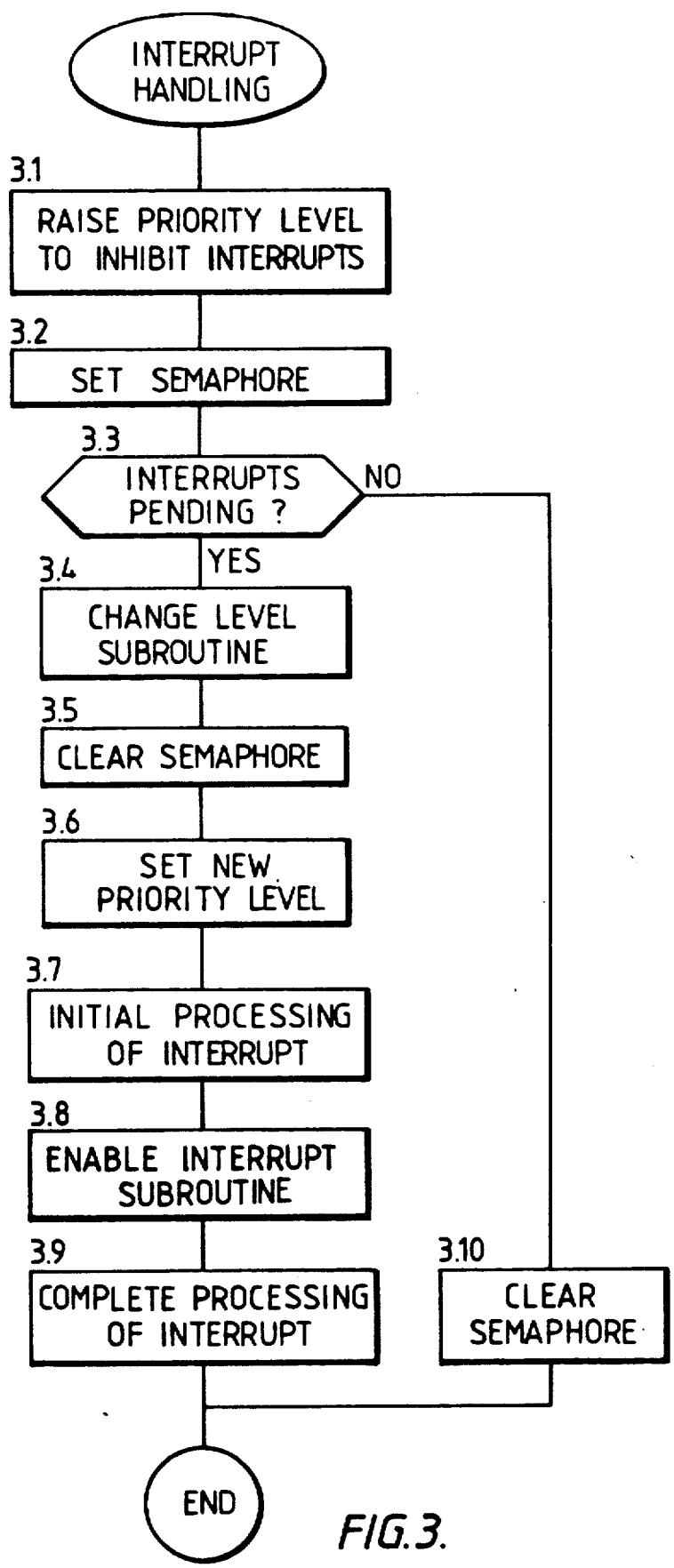
FIG. 3 is a flow chart showing the operation of a processing module in handling interrupts.

Referring now to FIG. 3, this shows the interrupt handling routine that is executed by any of the CPUs when it is interrupted.

(3.1). The first action of the interrupt handling routine is temporarily to raise the internal priority level of the CPU to the maximum possible value. This ensures that the CPU will not be interrupted by a subsequent higher priority interrupt, before it has finished handling the current interrupt.

(3.2). The SEMAPHORE bit is then set, so as to ensure that no other CPU can access the control information at the same time. If the SEMAPHORE bit is already set, the CPU waits, since this means that another CPU is already accessing the control information.

(3.3). The PENDING register is now checked to ensure that the interrupt is still pending. This is necessary since it is possible that the interrupt may have been handled by another CPU.

(3.4). If the interrupt is still pending, the CPU executes a CHANGE LEVEL subroutine. This updates the LEVEL table in the main store. It then scans the table to determine whether the current interrupt handler is still the CPU with the lowest priority level. If not, the lowest priority CPU is designated as the new interrupt handler and any inactive, pending, balanced interrupts are transferred to it from the old interrupt handler. Any active, pending, balanced interrupts are retained by the old interrupt handler, until they have been processed by it. The CHANGE LEVEL subroutine is described in more detail below with reference to FIG. 4.

(3.5). The SEMAPHORE is cleared.

(3.6). The CPU now sets its internal priority level to the priority level of the interrupt.

(3.7). The CPU now processes the interrupt up to the point where the interrupt request is withdrawn from the interrupt line.

(3.8). An ENABLE INTERRUPT subroutine is now executed. The purpose of this is to transfer responsibility for the interrupt to the current interrupt handler, so as to ensure that subsequent occurrences of this interrupt will be received by the current interrupt handler. The ENABLE INTERRUPT subroutine is described below in detail with reference to FIG. 5.

(3.9). The CPU now completes the interrupt processing. Details of the actions required to process the interrupt depend on the actual nature of the interrupt e.g. they may involve reading data from a disc file unit, or sending data to a printer. These actions form no part of the invention, and may be conventional, and so they will not be described in detail.

(3.10). If it was found that the interrupt was not still pending, the SEMAPHORE is cleared.

CHANGE LEVEL Subroutine

Figure 4:
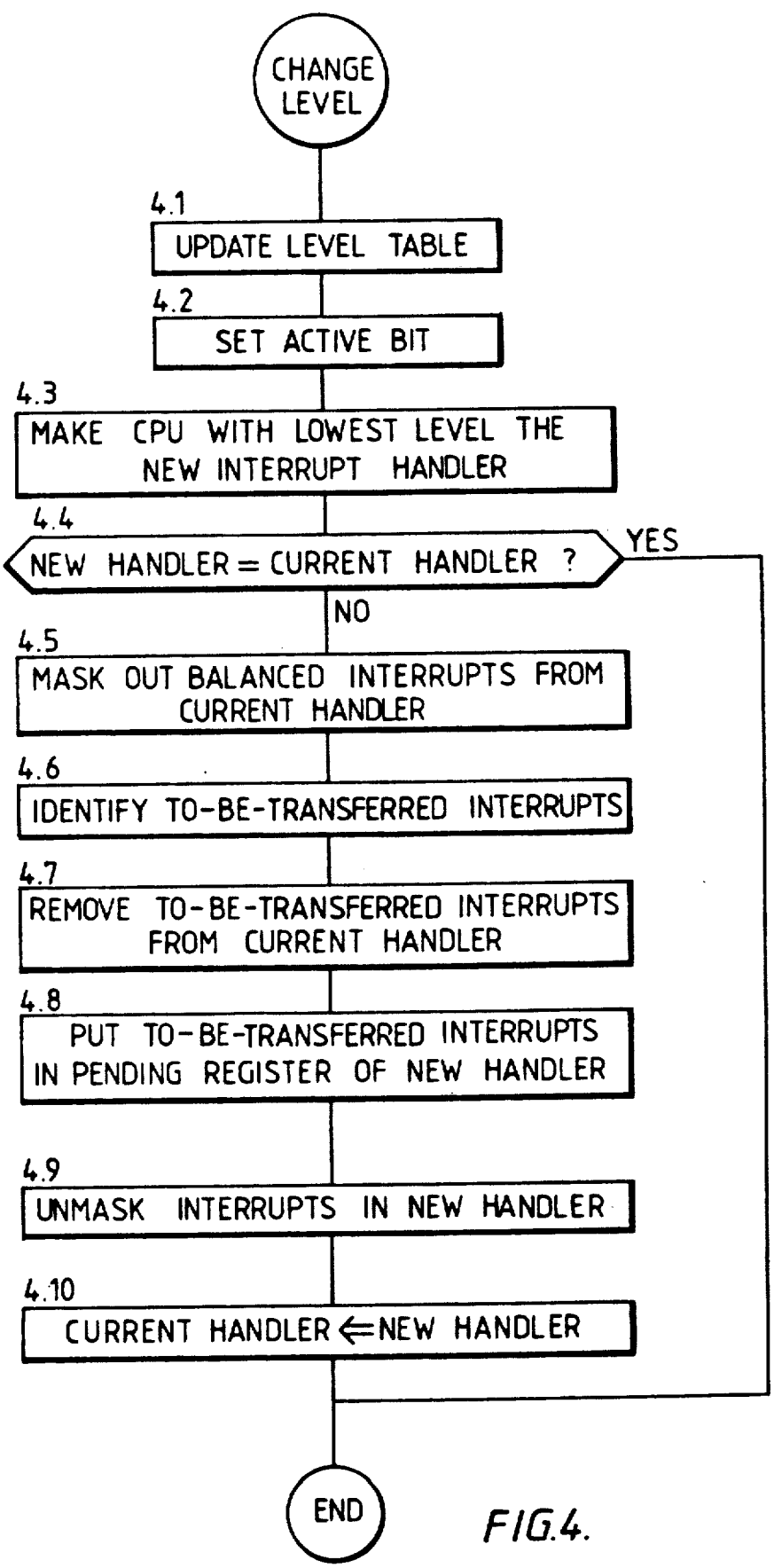
FIG. 4 is a flow chart of a CHANGE LEVEL procedure.

Referring now to FIG. 4, this shows the CHANGE LEVEL subroutine in detail. As mentioned above, this is executed by a CPU when it changes level as a result of an interrupt. It is also executed if the CPU voluntarily changes level for any reason.

(4.1). The first action is to update the LEVEL table in main store, by setting the entry for this CPU to the priority level of the interrupt.

(4.2). If the interrupt is a balanced interrupt, the corresponding ACTIVE bit is set, to indicate that this interrupt is now active.

(4.3). Each entry in the LEVEL table is now examined in turn. If the priority level of any CPU is found to be less that that of the current interrupt handler, that CPU is designated as the new interrupt handler.

(4.4). If the new handler is not the same as the current handler, the following steps are executed.

(4.5). The contents of the MASK register of the current handler are combined in an AND function with the inverse of the BALANCED bit pattern, and then the result is written back into the MASK register. The effect of this is to mask out all the balanced interrupts from the current handler.

(4.6). A bit pattern TO-BE-TRANSFERRED is now formed, to indicate which interrupts are to be transferred from the current interrupt handler to the new interrupt handler. This bit pattern is equal to the bit-by-bit AND function of:

(a) the PENDING register of the current handler,
(b) the BALANCED bit pattern, and
(c) the inverse of the ACTIVE bit pattern.

Thus TO-BE-TRANSFERRED indicates all the inactive, pending, balanced interrupts.

(4.7). The PENDING register of the current interrupt handler is now combined in a bit-by-bit AND function with the inverse of TO-BE-TRANSFERRED. The effect of this is to remove the specified interrupts from the current interrupt handler. Actually, only the interrupts from the CSM 15 will be removed. As explained above, the interrupts from the I/O bus are distributed in parallel to all the PENDING registers, and are cleared only when the I/O units withdraw their interrupt requests. Hence these interrupts do not have to be transferred to the new handler.

(4.8). The PENDING register of the new handler is then combined in a bit-by-bit OR function with TO-BE-TRANSFERRED. The effect of this is to transfer the specified interrupts to the new interrupt handler.

(4.9). The MASK register of the new handler is then combined, in a bit-by-bit OR function, with the bit-by-bit AND of TO-BE-BALANCED and the inverse of ACTIVE. The effect of this is to unmask the inactive, balanced interrupts in the new handler, so that they can now be received by the CPU. Any active interrupts remain masked, since they are not yet to be transferred.

(4.10). The new handler is now designated the current handler, and the subroutine terminates.

It should be noted that whenever the CHANGE LEVEL subroutine is called, the program that calls it is responsible for setting the SEMAPHORE before the subroutine is called and for clearing it after the subroutine is executed.

ENABLE INTERRUPT subroutine

Figure 5:
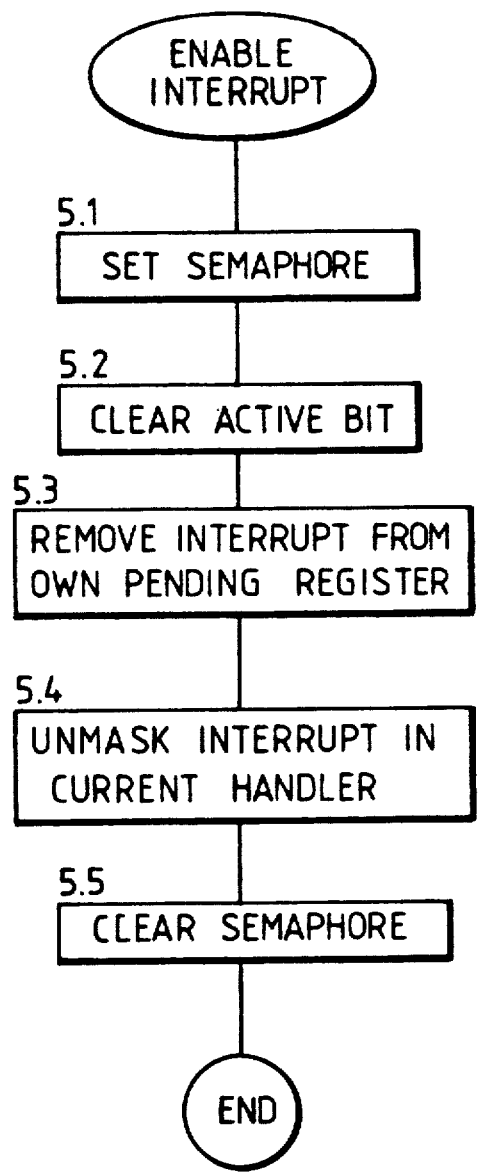
FIG. 5 is a flow chart of an ENABLE INTERRUPT procedure.

Referring now to FIG. 5, this shows the ENABLE INTERRUPT subroutine in detail. This subroutine is executed by a CPU whenever the CPU has processed an active interrupt to a stage such that it can now transfer responsibility for subsequent occurrences of that interrupt to the current interrupt handler.

(5.1). The first action is to set the SEMAPHORE bit. At the same time, the internal priority level of the CPU is raised to the maximum possible value, so as to inhibit further interrupts. The old priority level of the CPU is saved.

(5.2). The ACTIVE bit corresponding to the interrupt in question is then cleared, so as to indicate that this interrupt is now inactive.

(5.3) The PENDING register of the CPU that is executing the subroutine is then accessed, and the bit corresponding to the interrupt in question is cleared.

(5.4). The MASK register of the current interrupt handler is now accessed, and the bit corresponding to the interrupt in question is set. This unmasks the interrupt in the interrupt handler, so that the subsequent occurences of this interrupt will now be received by the interrupt handler.

(5.5). Finally, the SEMAPHORE is cleared, and the CPU is returned to its old priority level, which was saved at step (5.1) above.

We claim:

1. A data processing apparatus comprising:
   (a) a plurality of data processing modules, each with variable priority level,
   (b) distribution means for distributing a plurality of interrupt signals in parallel to all the processing modules,
   (c) designation means for designating one of the processing modules as an interrupt handler with responsibility for handling all the interrupts, and
   (d) means in each processing module, operative when that processing module is currently designated as interrupt handler by the designation means, for receiving the interrupt signals from said distribution means and processing those interrupt signals,
   (e) each processing module comprising means operative whenever the priority level of that processing module changes, for determining whether any of the processing modules now has a priority level lower than that of the currently designated interrupt handler and, if so, for causing the role of interrupt handler to be transferred to the processing module with lowest priority.

2. Apparatus according to claim 1 wherein each interrupt signal has a priority level associated with it, and wherein each processing module comprises means for changing its own priority level to that of an interrupt received by that processing module.

3. Apparatus according to claim 2 wherein, each processing module also includes means for changing its own priority level voluntarily.

4. Apparatus according to claim 1 including means operative when the role of interrupt handler is transferred for causing the responsibility for any interrupt that is already active to be retained by the processing module that is already handling that interrupt, and for causing responsibility for subsequent occurences of that interrupt to be transferred to the new interrupt handler.

5. Apparatus according to claim 1 wherein each processing module comprises a mask register for masking selected ones of the interrupt signals.

6. Apparatus according to claim 5 wherein the designation means comprises means for setting the mask register in the processing module currently designated as message handler, to unmask interrupts in that processing module, and for resetting the mask registers in all the other processing modules to mask out interrupts in those other processing modules.

7. Apparatus according to claim 5 including means for interrupting a processing module whenever the priority level of the highest priority unmasked interrupt signal is greater than the priority level of that module.

8. Apparatus according to claim 1 further including a memory, shared among all the processing modules, for storing control information indicating the priority levels of each module and identifying the currently designated interrupt handler.

9. Apparatus according to claim 8 including semaphore means for controlling access to said memory by the processing modules, permitting only one of the processing modules at a time to access said control information.

10. A method of operating a data processing apparatus comprising a plurality of data processing modules, the method comprising the steps:

(a) assigning each processing module a variable priority level,
(b) distributing a plurality of interrupt signals in parallel to all the processing modules,
(c) designating one of the modules as an interrupt handler with responsibility for handling all the interrupts,
(d) causing the processing module designated as interrupt handler to receive the interrupt signals and to process those interrupt signals, and
(e) whenever the priority level of any of the processing modules changes, determining whether any of the processing modules now has a priority level lower than that of the currently designated interrupt handler and, if so, causing the role of interrupt handler to be transferred to the module with lowest priority.

* * * * *